(12) United States Patent
Sugaya

(10) Patent No.: US 10,373,348 B2
(45) Date of Patent: Aug. 6, 2019

(54) IMAGE PROCESSING APPARATUS, IMAGE PROCESSING SYSTEM, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/096,341

(22) PCT Filed: Aug. 5, 2016

(86) PCT No.: PCT/JP2016/073115
§ 371 (c)(1),
(2) Date: Oct. 25, 2018

(87) PCT Pub. No.: WO2018/025402
PCT Pub. Date: Feb. 8, 2018

(65) Prior Publication Data
US 2019/0156522 A1 May 23, 2019

(51) Int. Cl.
*G06T 11/00* (2006.01)
*G06T 1/00* (2006.01)

(52) U.S. Cl.
CPC .............. *G06T 11/001* (2013.01); *G06T 1/00* (2013.01)

(58) Field of Classification Search
CPC .................................................. G06T 11/001
USPC ........................................................ 382/260
See application file for complete search history.

(56) References Cited

U.S. PATENT DOCUMENTS

| 7,634,103 B2* | 12/2009 | Rubinstenn .......... A45D 44/005 382/100 |
| 7,636,485 B2* | 12/2009 | Simon ................ G06K 9/00234 348/606 |
| 9,058,765 B1* | 6/2015 | Mallick ................. G06F 3/0482 |
| 9,087,388 B2* | 7/2015 | Iwasaki ..................... G06T 3/40 |
| 2003/0065636 A1* | 4/2003 | Peyrelevade ........ A45D 44/005 706/62 |
| 2008/0194928 A1 | 8/2008 | Bandic et al. |
| 2013/0169827 A1* | 7/2013 | Santos ............... H04N 5/23229 348/207.1 |
| 2014/0328509 A1* | 11/2014 | Guissin ................... G06T 5/002 382/100 |
| 2015/0366328 A1* | 12/2015 | Tamura .................. A45D 44/00 434/100 |
| 2016/0210602 A1* | 7/2016 | Siddique ............ G06Q 20/0453 |
| 2017/0024918 A1* | 1/2017 | Sugaya ................... G06T 11/00 |

(Continued)

FOREIGN PATENT DOCUMENTS

JP 2000-069404 3/2000
JP 2004-094917 3/2004

(Continued)

*Primary Examiner* — Jonathan S Lee
(74) *Attorney, Agent, or Firm* — Lex IP Meister, PLLC

(57) ABSTRACT

A user terminal includes an acquiring unit that acquires a face image of a user, a generating unit that generates at least one face image to which makeup has been applied using the face image acquired by the acquiring unit, a combining unit that combines parts of a plurality of face images including the face image acquired by the acquiring unit or the at least one face image generated by the generating unit to generate a combined image 551 or 552, and an output unit that outputs the combined image generated by the combining unit.

10 Claims, 15 Drawing Sheets

(56) References Cited

U.S. PATENT DOCUMENTS

| | | | |
|---|---|---|---|
| 2017/0177927 A1* | 6/2017 | Fujita | G06K 9/00302 |
| 2018/0075524 A1* | 3/2018 | Sartori Odizzio | G06Q 30/0643 |
| 2018/0182144 A1* | 6/2018 | Imoto | H04N 7/147 |
| 2018/0182145 A1* | 6/2018 | Imoto | G06T 1/00 |
| 2018/0268572 A1* | 9/2018 | Nishi | G06T 7/73 |
| 2018/0374128 A1* | 12/2018 | Mao | G06Q 30/0281 |

FOREIGN PATENT DOCUMENTS

| | | |
|---|---|---|
| JP | 2008-003724 | 1/2008 |
| JP | 2010-017360 | 1/2010 |
| JP | 2010-515489 | 5/2010 |
| JP | 2012-113747 | 6/2012 |
| JP | 2014-115984 | 6/2014 |
| WO | 2008/102440 | 8/2008 |

* cited by examiner

US 10,373,348 B2

IMAGE PROCESSING APPARATUS, IMAGE PROCESSING SYSTEM, AND PROGRAM

TECHNICAL FIELD

The present invention relates to an image processing apparatus, an image processing system, and a program.

BACKGROUND ART

There are known techniques for performing makeup simulation. For example, Patent Document 1 describes a makeup simulation system that applies a makeup process to a moving image obtained by capturing a user's face. Patent Document 2 describes a game apparatus that performs a makeup simulation using a user's face image.

PRIOR ART DOCUMENT

Patent Document

Patent Document 1: Japanese Patent Application Publication No. 2012-113747
Patent Document 2: Japanese Patent Application Publication No. 2010-17360

SUMMARY OF THE INVENTION

Technical Problem

In the techniques described in Patent Documents 1 and 2, a face image before the makeup is applied and a face image after the makeup is applied are merely displayed, and there is no method to make it easy to recognize the effect of the makeup. An object of the present invention is to make it easy to recognize the effect of the makeup in the makeup simulation.

Technical Solution

According to the present invention, there is provided an image processing apparatus including an acquiring unit that acquires a face image of a user, a generating unit that generates at least one face image to which makeup has been applied using the acquired face image, a combining unit that combines parts of a plurality of face images including the acquired face image or the at least one generated face image to generate a combined image, and an output unit that outputs the generated combined image.

Effects of the Invention

According to the present invention, it is possible to easily recognize the effect of makeup in the makeup simulation.

DESCRIPTION OF REFERENCE NUMBERS

1, 3: Purchase support system, 10: server, 20: user terminal, 201: acquiring unit, 202: generating unit, 203: combining unit, 204: output unit

DETAILED DESCRIPTION OF THE EMBODIMENTS

Figure 1:
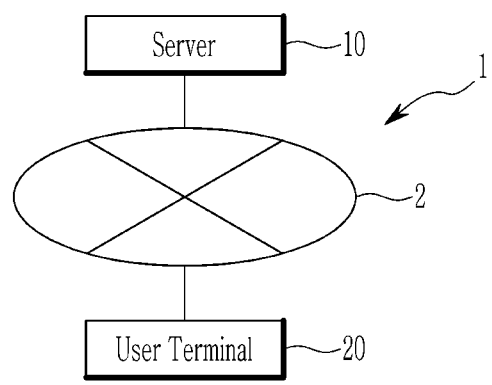
FIG. 1 is a diagram showing an example of a configuration of a purchase support system 1.

Configuration
FIG. 1 is a diagram showing an example of a configuration of a purchase support system 1 according to the present embodiment. In the purchase support system 1, a makeup simulation using a user's face image is performed in order to support purchase of a cosmetic product. The purchase support system 1 includes a server 10 and a user terminal 20 (an example of an image processing apparatus). The server 10 and the user terminal 20 are connected via a network 2. The network 2 is, for example, the Internet. However, the network 2 is not limited to the Internet but may be another communication line.

The server 10 stores product information of cosmetic products which are registered in advance. The product information of the cosmetic product includes, for example, a name, a brand name, and a price of the cosmetic product, and image data representing the cosmetic product. The server 10 provides the user terminal 20 with the product information of the cosmetic product corresponding to makeup on which a simulation has been performed.

The user terminal 20 is used by a user. The user simulates makeup using the user terminal 20. In addition, the user uses the user terminal 20 to browse product information of the cosmetic products provided from the server 10.

Figure 2:
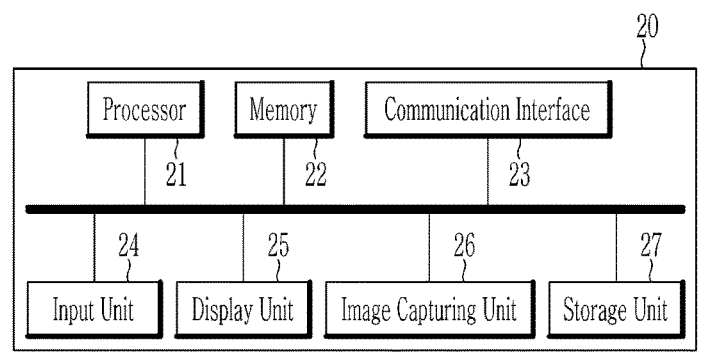
FIG. 2 is a diagram showing an example of a hardware configuration of a user terminal 20.

FIG. 2 is a diagram showing an example of a hardware configuration of a user terminal 20. The user terminal 20 is a computer such as a tablet terminal, a portable terminal, a personal computer, or the like. The user terminal 20 includes a processor 21, a memory 22, a communication interface 23, an input unit 24, a display unit 25, an image capturing unit 26, and a storage unit 27.

The processor 21 executes various processes according to a program stored in the memory 22. As the processor 21, for example, a CPU (Central Processing Unit) is used. The memory 22 stores the program executed by the processor 21. As the memory 22, for example, a RAM (Random Access Memory) is used. The communication interface 23 is connected to the network 2 and performs communication via the network 2.

The input unit 24 is used for an operation of the user terminal 20 and inputs information corresponding to the operation to the user terminal 20. As the input unit 24, for example, a touch panel or a button is used. The display unit 25 displays various kinds of information. As the display unit 25, for example, a liquid crystal display is used. The image capturing unit 26 captures an image. As the image capturing unit 26, for example, a camera is used. The storage unit 27 stores various programs and data. As the storage unit 27, for example, a flash memory or a hard disk drive is used.

Figure 3:
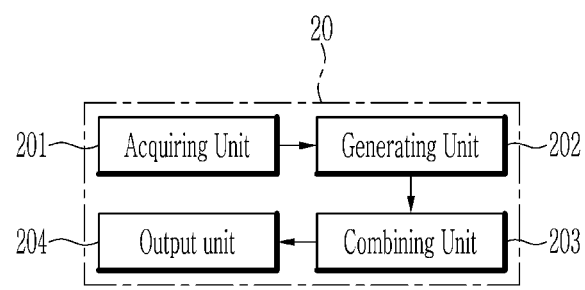
FIG. 3 is a diagram showing an example of a functional configuration of a user terminal 20.

FIG. 3 is a diagram showing an example of a functional configuration of a user terminal 20. The user terminal 20 functions as an acquiring unit 201, a generating unit 202, a combining unit 203, and an output unit 204. These functions are realized by one or more processors 21 executing the program stored in the memory 22.

The acquiring unit 201 acquires a user's face image. For example, the acquiring unit 201 acquires the user's face image captured by the image capturing unit 26. As another example, when the user's face image is stored in advance in the storage unit 27, the acquiring unit 201 may acquire the user's face image from the storage unit 27.

The generating unit 202 generates at least one face image to which the makeup has been applied using the face image acquired by the acquiring unit 201. In a case where a process of applying the makeup includes a plurality of processes, the generating unit 202 may generate a plurality of face images to which the makeup up to each process has been applied. Further, the term "makeup up to a process" includes both makeup applied in the corresponding process and makeup applied in processes prior to the corresponding process.

The combining unit 203 combines parts of a plurality of face images including the face image acquired by the acquiring unit 201 or at least one face image generated by the generating unit 202 to generate a combined image. The plurality of face images are, for example, two face images including a first face image and a second face image. The first face image may be the face image acquired by the acquiring unit 201, that is, the face image before the makeup is applied, or may be a face image to which the makeup up to the first process among the plurality of processes has been applied. The second face image may be a face image to which the makeup of all of the plurality of processes has been applied, or a face image to which the makeup up to the second process among the plurality of processes has been applied. The first process and the second process are different processes.

The output unit 204 outputs various images including the combined image generated by the combining unit 203. For example, the output unit 204 displays the combined image on the display unit 25. As another example, the output unit 204 may transmit the combined image to an external device via the communication interface 23. As yet another example, when the user terminal 20 includes a printer, the output unit 204 may print the combined image.

Operation

Figure 4:
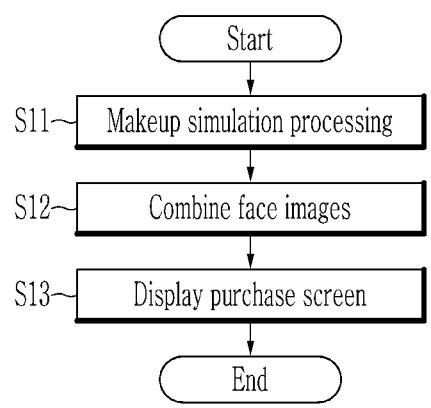
FIG. 4 is a flowchart showing an example of an operation of the user terminal 20.

FIG. 4 is a flowchart showing an example of an operation of a user terminal 20 according to the present embodiment. In this operation, a makeup simulation is performed using a user's face image. Then, a cosmetic product corresponding to the makeup which has been subjected to the simulation is recommended to the user.

In step S11, a makeup simulation process is performed. Specifically, the user first captures a face image 261 of the user using an image capturing unit 26. An acquiring unit 201 acquires the face image 261 captured by the image capturing unit 26. When the face image 261 is captured, an output unit 204 displays on a display unit 25 a screen 251 for accepting a selection of a portion (hereinafter referred to as a "target portion") to which makeup is to be applied.

Figure 5:
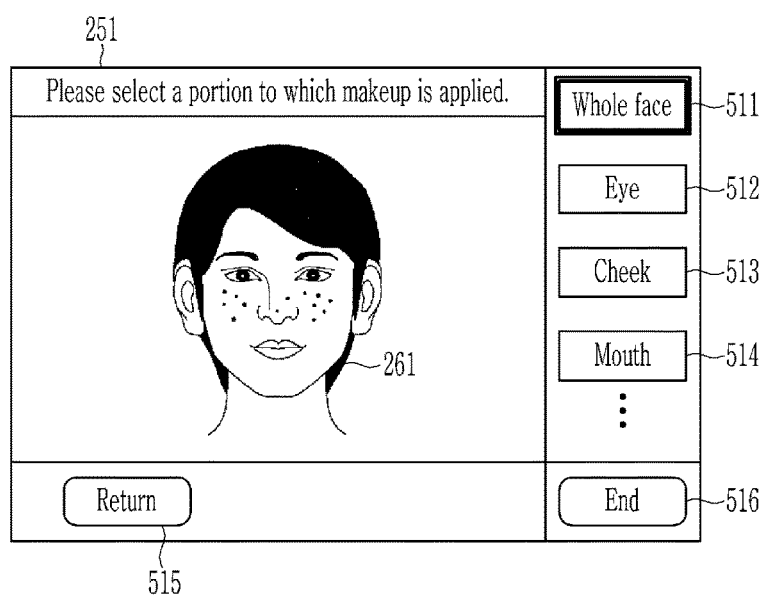
FIG. 5 is a diagram showing an example of a screen 251.

FIG. 5 is a diagram showing an example of a screen 251. The screen 251 includes a face image 261 before makeup is applied. In addition, the screen 251 includes buttons 511 to 514 used for selecting a target portion. The target portion includes face parts such as the whole face, an eye, a cheek, a mouth, and the like. The term "eye" as used herein means not an eyeball portion between eyelids but an eyehole. Here, it is assumed that the user first paints a color of a foundation to an area of the whole face in the face image 261. In this case, the user presses the button 511 using the input unit 24. As a result, the whole face is selected as the target portion.

As another example, the target portion may be selected by using a cursor displayed on the screen 251. In this case, the user uses the input unit 24 to move the cursor to a position of a desired target portion and selects the target portion. The target portion can be selected by such an operation.

Figure 6:
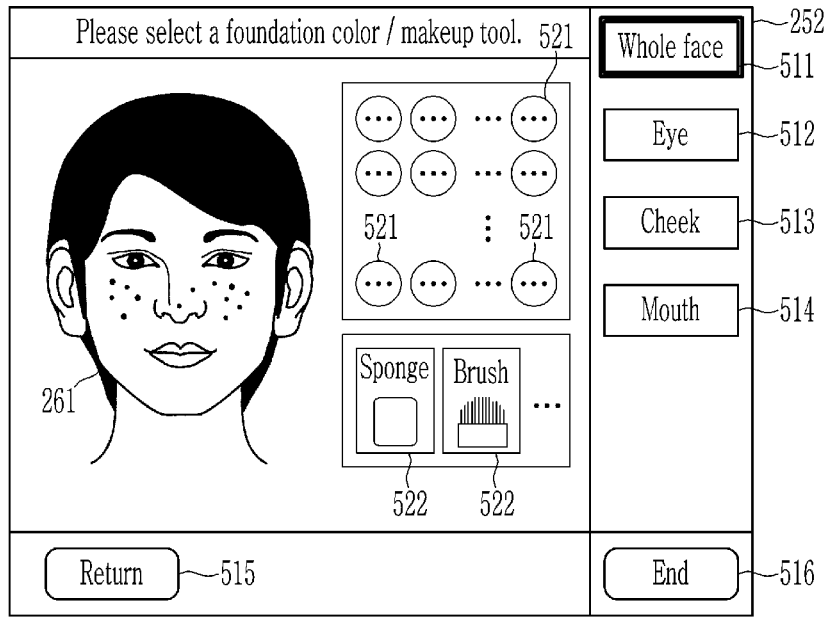
FIG. 6 is a diagram showing an example of a screen 252.
Figure 6:
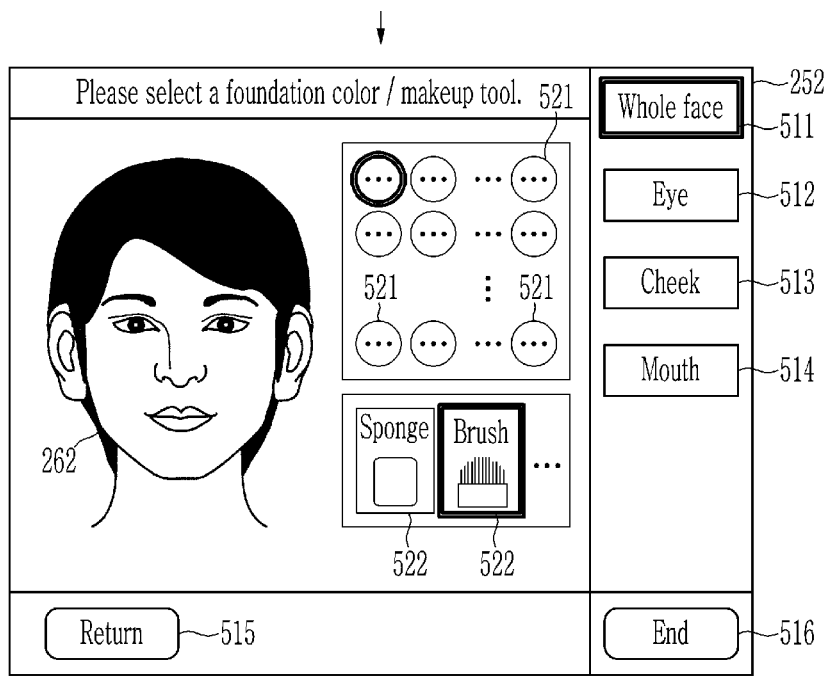

When the whole face is selected as the target portion, the output unit 204 displays on the display unit 25 a screen 252 for accepting a selection of the color of the foundation. FIG. 6 is a diagram showing an example of the screen 252. The screen 252 includes a plurality of color samples 521 used for selecting the color of the foundation. The color samples 521 may include not only color samples 521 having different types of colors but also color samples 521 having different color densities or textures. The texture varies depending on, for example, an amount of pearls, an amount of lamellae, or transparency. The color of the color sample 521 may be a color of a product being actually sold, or may be not the color of the product being actually sold. The user performs an operation of selecting a color sample 521 representing a color of a desired foundation from among the color samples 521 using the input unit 24. As a result, the color of the foundation is selected.

If the color of the foundation is selected, the generating unit 202 paints the selected color of the foundation to the area of the whole face included in the face image 261. Specifically, the generating unit 202 extracts the area of the whole face from the face image 261 by image recognition. For the extraction, a well-known face recognition technique using positional relationships of feature points, such as eyes, a nose, a mouth, and the like, may be used. Subsequently, the generating unit 202 generates a new layer 61 and paints the selected color of the foundation in a range corresponding to the extracted area in the layer 61.

Figure 7:
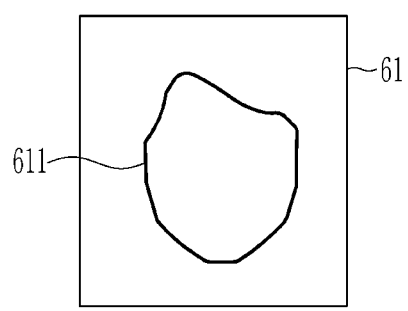
FIG. 7 is a diagram showing an example of a layer 61.

FIG. 7 is a diagram showing an example of the layer 61. The layer 61 includes a layer image 611 representing a color portion of a foundation painted on the area of the whole face. If the layer 61 is generated, the layer 61 is superimposed on the face image 261 shown in FIG. 6. As a result, the face image 262 painted with the color of the foundation is displayed.

Further, the screen 252 accepts a selection of a makeup tool to be used when the foundation is painted. The screen 252 includes a plurality of icons 522 used for selecting a makeup tool such as a sponge or a brush. Each icon 522 includes an image representing the makeup tool. In addition, this image may be an image representing a product being actually sold or an illustration representing the makeup tool. The user uses the input unit 24 to select the icon 522 representing a desired makeup tool from among the plurality of icons 522. As a result, the makeup tool is selected. On the other hand, the makeup tool may not be necessarily selected.

When the makeup tool is selected, the generating unit 202 paints the color of the foundation with a density according to the selected makeup tool or in the uniformity of the density. For example, when the brush is selected, the foundation color may be painted with the density being lower than a reference density and in the uniformity being higher than the uniformity of the reference density. On the other hand, when the sponge is selected, the foundation color may be painted with the density being higher than the reference density and in the uniformity being lower than the uniformity of the reference density. In this way, the density of the makeup color or the uniformity of the density is changed by the makeup tool selected by the user.

Next, it is assumed that the user paints a color of an eye shadow in an eye area. In this case, the user presses a button 512 shown in FIG. 6 using the input unit 24. Thus, an eye is selected as a target portion. If the eye is selected as the target portion, the output unit 204 displays on the display unit 25 a screen 253 for accepting a selection of the color of the eye shadow.

Figure 8:
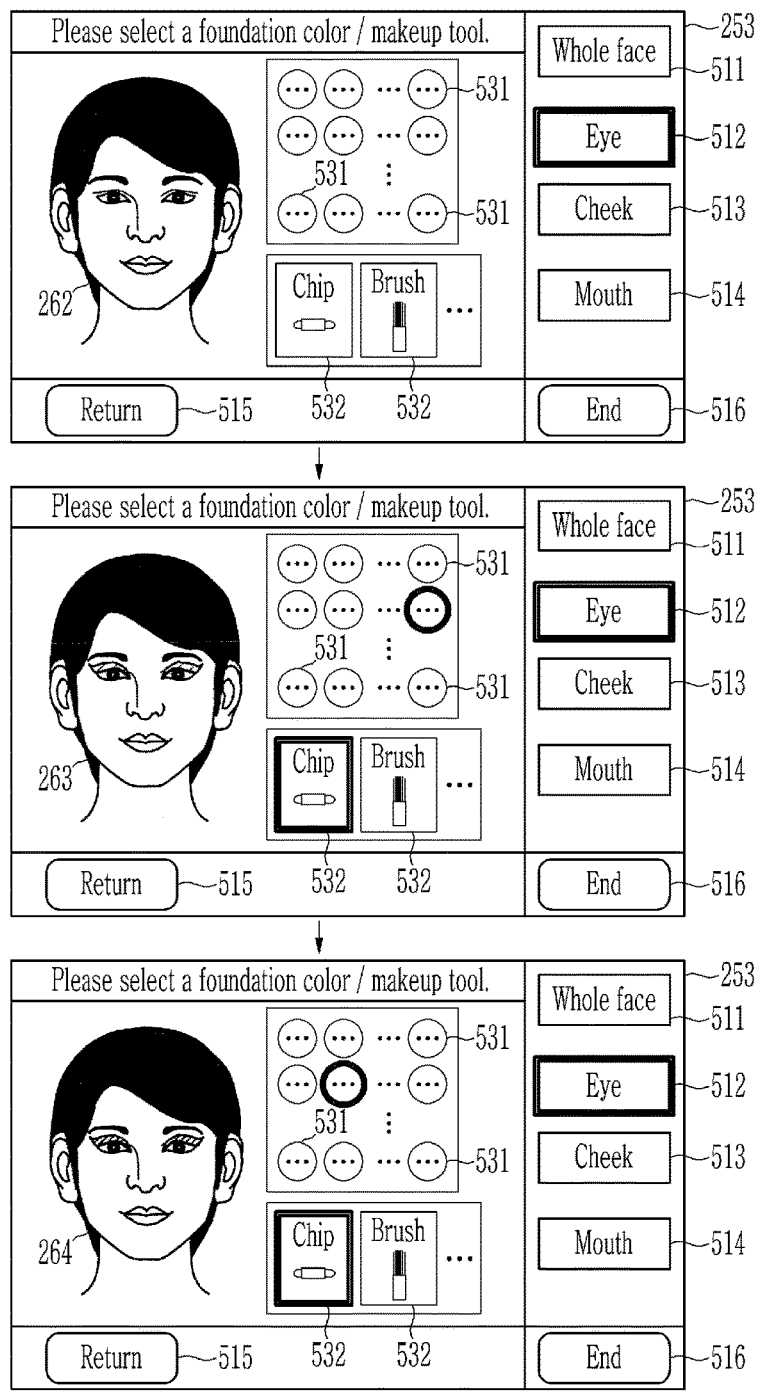
FIG. 8 is a diagram showing an example of a screen 253.

FIG. 8 is a diagram showing an example of the screen 253. The screen 253 includes a plurality of color samples 531 used for selecting the color of the eye shadow. A color of the color sample 531 may be a color of a product being actually sold or may be not the color of the product being actually sold. The user performs an operation of selecting the color sample 531 representing a desired color of the eye shadow from among the plurality of color samples 531 using the input unit 24. As a result, the color of the eye shadow is selected.

If the color of the eye shadow is selected, the generating unit 202 paints the selected color of the eye shadow in an eye area included in the face image 262. Specifically, the generating unit 202 extracts the eye area from the face image 261 by image recognition. Subsequently, the generating unit 202 generates a new layer 62-1 and paints the selected color of the eye shadow in a range corresponding to the extracted area in the layer 62-1.

Figure 9:
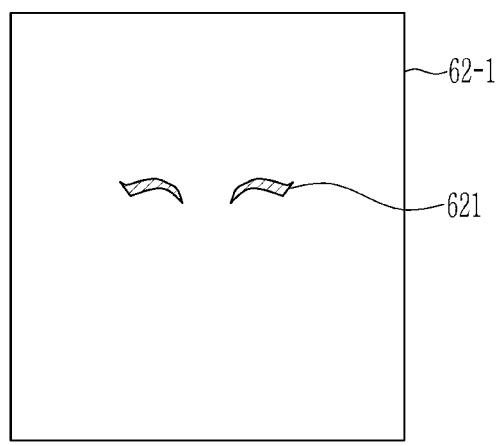
FIG. 9 is a diagram showing an example of a layer 62-1.

FIG. 9 is a diagram showing an example of the layer 62-1. The layer 62-1 includes a layer image 621 representing a color portion of the eye shadow painted on the eye area. If the layer 62-1 is generated, the layer 62-1 is superimposed on the face image 262 shown in FIG. 8. As a result, the face image 263 painted with the color of the foundation and the color of the eye shadow is displayed.

Further, the screen 253 accepts a selection of a makeup tool to be used when the eye shadow is painted. The screen 253 includes a plurality of icons 532 used for selecting a makeup tool such as a chip or a brush. Each icon 532 includes an image representing the makeup tool. In addition, this image may be an image representing a product being actually sold or an illustration representing the makeup tool. The user performs an operation of selecting the icon 532 representing a desired makeup tool from the plurality of icons 532 using the input unit 24. As a result, the makeup tool is selected. On the other hand, the makeup tool may not be necessarily selected.

When the makeup tool is selected, the generating unit 202 may paint the color of the eye shadow with a density according to the selected makeup tool or in a range according to the makeup tool. Further, the generating unit 202 may blur a boundary portion of the color of the eye shadow, by the range according to the selected makeup tool. For example, when the chip is selected, the color of the eye shadow may be painted with the density being higher than a reference density and in the range being less than a reference range. On the other hand, when the brush is selected, the color of the eye shadow may be painted with the density being lower than the reference density and in the range being greater than the reference range, and its boundary portion may be blurred by the range being greater than a reference range. In this way, the density of the makeup color, the range to which the makeup is applied, or the range by which the boundary portion of the makeup color is blurred is changed by the makeup tool selected by the user.

Further, the user may paint the color of the eye shadow a plurality of times. In this case, after the color of the eye shadow is painted at the first time, the user again uses the input unit 24 to select the color sample 531 representing a desired color of the eye shadow from among the plurality of color samples 531 shown in FIG. 8. As a result, the color of the eye shadow to be painted at the second time is selected.

When the same color as the color of the eye shadow applied at the first time is selected, the color of the eye shadow becomes thicker by overlappingly painting the colors of the eye shadow. In this way, when the same makeup color is painted overlappingly, a density of the makeup color increases as the number of times of overlappingly painting increases. On the other hand, when a color different from the color of the eye shadow painted at the first time is selected, the color of the eye shadow is changed by overlappingly painting the colors of the eye shadow. Specifically, the color of the eye shadow is changed to a combination of the color of the eye shadow painted at the first time and the color of the eye shadow painted at the second time. In this way, when the different makeup colors are overlappingly painted, the makeup color is changed to a color into which all the overlapped makeup colors are combined.

Further, when the colors of the eye shadow are overlappingly painted a plurality of times, a different layer may be generated each time the color of the eye shadow is painted once. For example, when the color of the eye shadow is painted at the first time, the layer 62-1 shown in FIG. 9 is generated. When the color of the eye shadow is painted at the second time, a new layer 62-2 is generated.

Figure 10:
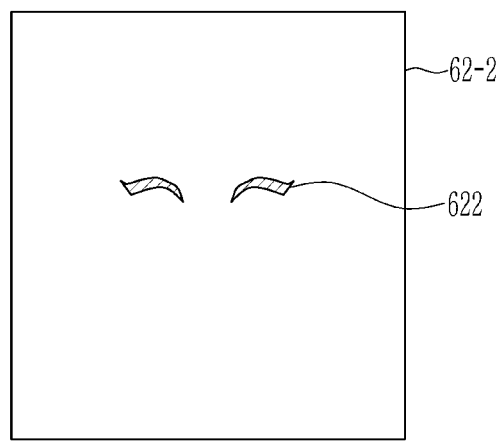
FIG. 10 is a diagram showing an example of a layer 62-2.

FIG. 10 is a diagram showing an example of the layer 62-2. The layer 62-2 includes a layer image 622 representing a color portion of the eye shadow painted on the eye area, similarly to the layer image 621. If the layer 62-2 is generated, the layer 62-2 is superimposed on the face image 263 shown in FIG. 8. As a result, a face image 264 which is painted with the color of the foundation and then is painted with the color of the eye shadow two times is displayed.

Figure 11:
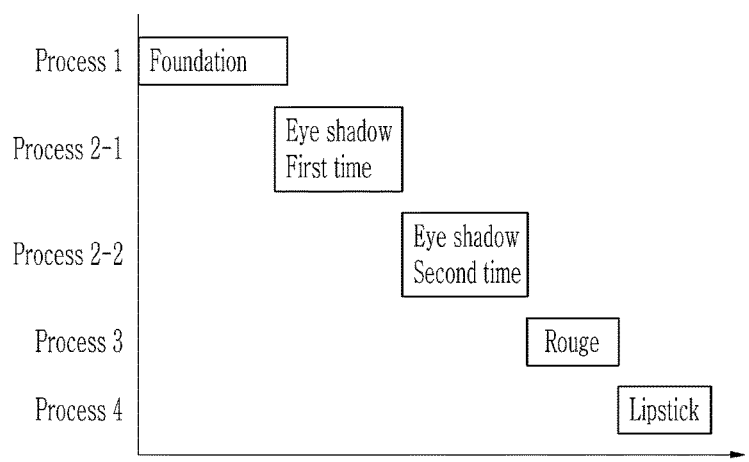
FIG. 11 is a diagram showing an example of a plurality of processes of applying makeup.

In this manner, the makeup is applied to the user's face image 261 by the plurality of processes. The plurality of processes are a series of processes in which the order is determined. FIG. 11 is a diagram showing an example of processes of applying makeup. In this example, the processes of applying the makeup include processes 1, 2-1, 2-2, 3, and 4. The processes are performed in the order of processes 1, 2-1, 2-2, 3, and 4.

In the process 1, a color of a foundation is painted in an area of the whole face. In the process 1, a layer 61 shown in FIG. 7 is generated. Subsequently, in the process 2-1, a color of an eye shadow is painted to an eye area (first time). In the process 2-1, a layer 62-1 shown in FIG. 9 is generated. Subsequently, in the process 2-2, the color of eye shadow is overlappingly painted on the eye area (second time). In the process 2-2, a layer 62-2 shown in FIG. 10 is generated. Subsequently, in the process 3, a color of rouge is painted on a cheek area. In the process 3, a layer including a layer image representing a color portion of the rouge painted on the cheek area is generated. Subsequently, in the process 4, a lipstick is painted on a mouth area. In the process 4, a layer including a layer image representing a color portion of the lipstick painted on the mouth area is generated.

Among these processes, the processes 1, 3, and 4 are processes which are divided based on areas to which the makeup is applied. On the other hand, the processes 2-1 and 2-2 are processes which are divided based on the times when the makeup is performed. The process of painting the color of the eye shadow is divided into the processes 2-1 and 2-2 in the example shown in FIG. 11, but these processes may be handled as one process.

For each process shown in FIG. 11, the generating unit 202 generates a face image to which the makeup up to the corresponding process has been applied. For example, with respect to the process 1, a face image 262 after the makeup is applied in the process 1 is generated by overlapping the layer 61 shown in FIG. 7 on a face image 261 before the makeup is applied. With respect to the process 2-1, a face image 263 after the makeup is applied in the processes 1 and 2-1 is generated by overlapping the layer 62-1 shown in FIG. 9 on the face image 262. With respect to the process 2-2, a face image 264 after the makeup is applied in the processes 1, 2-1, and 2-2 is generated by overlapping the layer 62-2 shown in FIG. 10 on the face image 263. Similarly, in the other processes, a face images is generated by overlapping all the layers generated in the processes prior to the corresponding process on the face image 261 before the makeup is applied.

Here, a content of the makeup performed in each process may be changed later. As shown in FIG. 5, FIG. 6, and FIG. 8, each of the screens displayed in the simulation processing includes a return button 515. When the user wants to change the content of the makeup, the user presses the return button 515 using the input unit 24. If the return button 515 is pressed, the output unit 204 displays on the display unit 25 a list 254 of processes of applying the makeup. The process list 254 may be included in a part of the screen already displayed on the display unit 25, or may be displayed in a pop-up form on the screen.

Figure 12:
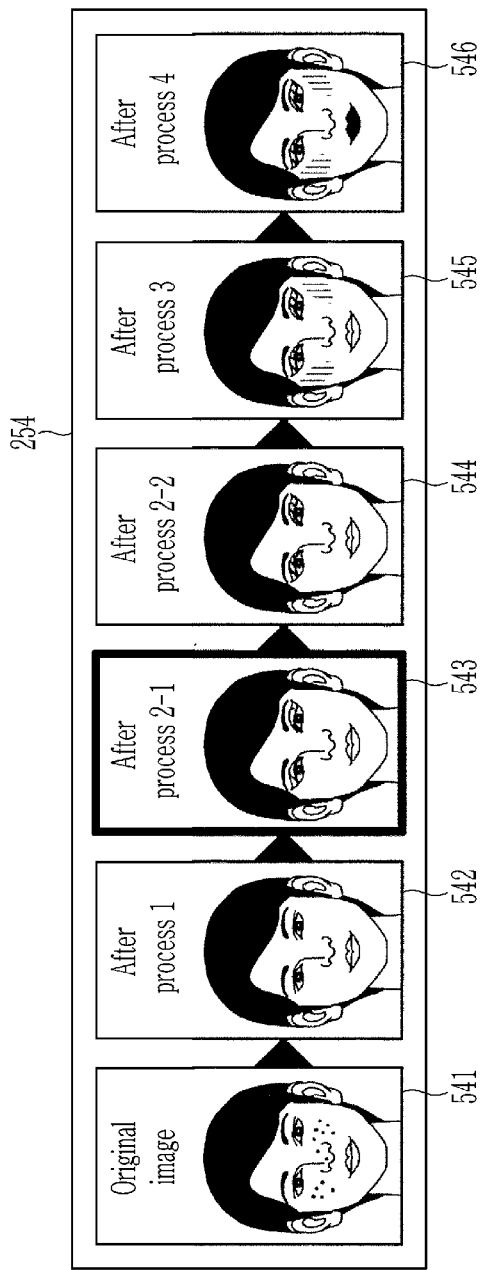
FIG. 12 is a diagram showing an example of a list 254 of processes of applying makeup.

FIG. 12 is a diagram showing an example of a list 254 of processes of performing the makeup. The process list 254 includes icons 541 to 546 used for selecting each process. Each of the icons 541 to 546 includes a thumbnail of a face image to which the makeup up to the corresponding process has been applied. For example, the icon 541 is used to select a state before the makeup is applied. The icon 541 includes a thumbnail of a face image 261 before the makeup is applied. The icon 542 is used for selecting the process 1. The icon 542 includes a thumbnail of a face image 262 after the makeup is applied in the process 1. The icon 543 is used for selecting the process 2-1. The icon 543 includes a thumbnail of a face image 263 after which the makeup is applied in the process 2-1.

Here, it is assumed that the color of the foundation painted in the process 1 (an example of a target process) is changed after the process 4 is completed. In this case, the user performs an operation of selecting the icon 542 using the input unit 24. If the icon 542 is selected, the output unit 204 displays the screen 252 shown in FIG. 6 on the display unit 25 again. The user performs an operation of selecting the color sample 521 representing a different color of the foundation from among the plurality of color samples 521 using the input unit 24. As a result, the different color of the foundation is selected.

If the different color of the foundation is selected, the generating unit 202 changes the color of the foundation painted on the area of the whole face in the process 1 to the selected different color. The change in color of the foundation is reflected in all the face images to which the makeup of the process 1 has been applied. Specifically, the generating unit 202 changes the color of the layer image 611 included in the layer 61 shown in FIG. 7 to the selected different color. As a result, the color of the foundation is changed to the different color in all the face images including the layer 61, that is, in all the face images generated in the processes after the process 1.

As another example, the generating unit 202 may generate a new layer and paint the different color of the foundation in a range corresponding to the area of the whole face in the new layer. In this case, the new layer is used instead of the layer 61.

Further, at least one process included in the plurality of processes may be deleted later. For example, if the color of the eye shadow painted at the first time is unnecessary after the process 4 is completed, the process 2-1 (an example of a target process) may be deleted. In this case, the user performs a deleting operation by selecting the icon 543 shown in FIG. 12 using the input unit 24. As a result, the process 2-1 is deleted.

If the process 2-1 is deleted, the generating unit 202 deletes the layer 62-1 generated in the process 2-1. As a result, the color portion of the eye shadow painted at the first time is deleted from all the face images including the layer 62-1, that is, from all the face images generated in the processes after the process 2-1.

As shown in FIG. 5, FIG. 6, and FIG. 8, each of the screen displayed in the simulation processing includes an end button 516. In order to end the makeup simulation, the user presses the end button 516 using the input unit 24. If the end button 516 is pressed, the process proceeds to step S12 shown in FIG. 4.

In step S12, a combining unit 203 combines the left half of the face image 261 (an example of a first face image) before the makeup is applied and the right half of a face image (an example of a second face image) after the makeup of all the processes is applied to generate a combined image 551. The face image after the makeup of all the processes is applied is, for example, in a case where the makeup is applied by the processes 1, 2-1, 2-2, 3, and 4 shown in FIG. 11, a face image after the makeup is applied in these processes. Specifically, the combining unit 203 first cuts out the left half from the face image 261. Subsequently, the combining unit 203 cuts out the right half from the user's face image to which the makeup of all the processes has been applied. Then, the combining unit 203 combines these parts to generate the combined image 551. The output unit 204 displays a screen 255 including the combined image 551 on the display unit 25.

Figure 13:
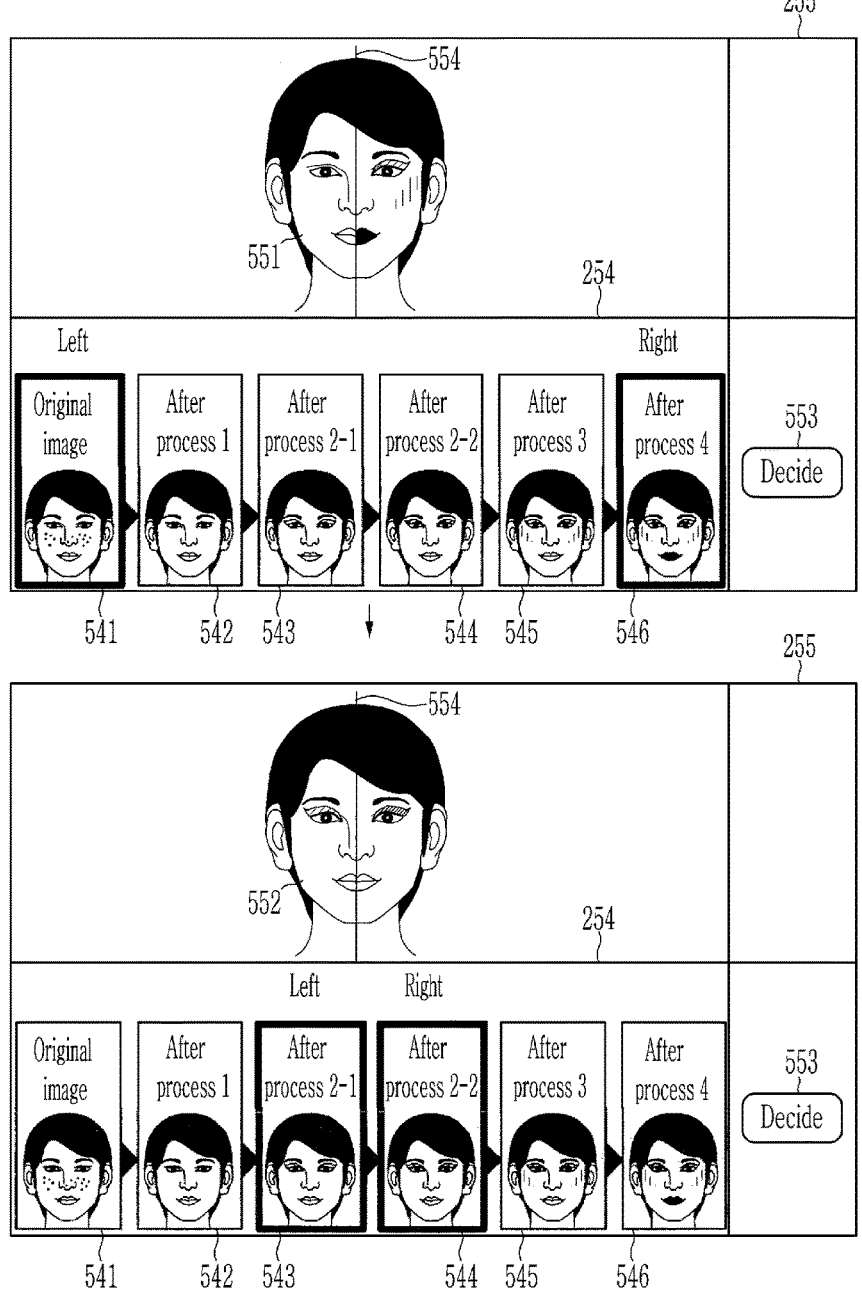
FIG. 13 is a diagram showing an example of a screen 255.

FIG. 13 is a diagram showing an example of the screen 255. The screen 255 includes the combined image 551. The left half of the combined image 551 is the user's face image before the makeup is applied and the right half is the user's face image after the makeup of all the processes is applied. Further, the screen 255 includes a list 254 of the processes shown in FIG. 12. The user can freely change the left half or the right half of the combined image 551 by selecting a desired process.

Here, it is assumed that the left half of the combined image 551 is changed to a face image 263 (an example of a first face image) to which the makeup up to the process 2-1 (an example of a first process) has been applied, and the right half of the combined image 551 is changed to a face image 264 (an example of a second face image) to which the makeup up to the process 2-2 (an example of a second process) has been applied. In this case, the user performs an operation of selecting icons 543 and 544 using the input unit 24. In this case, the combining unit 203 cuts out the left half from the face image 263. Further, the combining unit 203 cuts out the right half from the face image 264. Then, the combining unit 203 combines these parts to generate a combined image 552. If the combined image 552 is generated, the combined image 552 is displayed instead of the combined image 551.

The screen 255 includes a decision button 553. In a case where the user likes the makeup on which the simulation has been performed, the user presses the decision button 553 using the input unit 24. If the enter button 553 is pressed, the process proceeds to step S13 shown in FIG. 4.

In step S13, the output unit 204 displays a purchase screen 256 on the display unit 25. The purchase screen 256 includes product information of a cosmetic product used for the makeup on which the simulation has been performed. The product information of the cosmetic product is provided from the server 10. Specifically, the output unit 204 transmits information indicating the makeup on which the simulation has been performed to the server 10. This information includes information indicating the color of the makeup. The server 10 determines the cosmetic product corresponding to the makeup on which the simulation has been performed based on the information received from the user terminal 20. For example, when the color of the makeup on which the simulation has been performed is a color of makeup using a cosmetic product being actually sold, this cosmetic product may be determined. On the other hand, when the makeup on which the simulation has been performed is not the color of makeup using the cosmetic product being actually sold, a cosmetic product to be used for makeup with a color similar to the color of the makeup on which the simulation has been performed may be determined. Here, it is assumed that foundation A, eye shadow B, rouge C, and lipstick D are determined. The server 10 transmits information on the determined cosmetic products to the user terminal 20.

Figure 14:
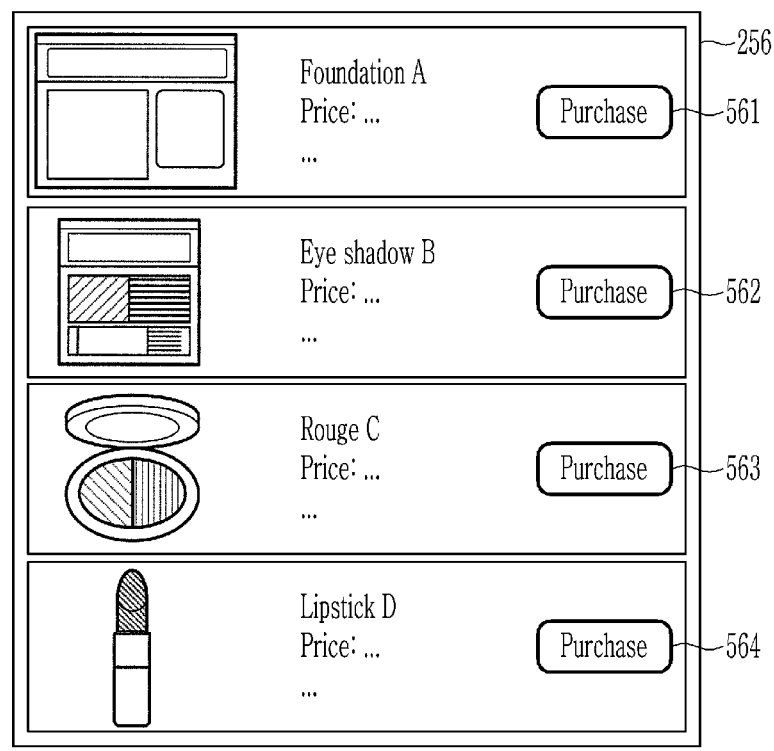
FIG. 14 is a diagram showing an example of a purchase screen 256.

FIG. 14 is a diagram showing an example of the purchase screen 256. The purchase screen 256 includes product information on the foundation A, product information on the eye shadow B, product information on the rouge C, and product information on the lipstick D. The purchase screen 256 includes purchase buttons 561 to 564. The Purchase buttons 561 to 564 are used for operations of purchasing the foundation A, the eye shadow B, the rouge C, and the lipstick D, respectively. For example, when purchasing the eye shadow B, the user presses the purchase button 562 using the input unit 24. If the purchase button 562 is pressed, a procedure for purchasing the eye shadow B is performed by electronic commerce. As a result, the purchase of the eye shadow B is completed.

According to the present embodiment, it is possible to compare face images before and after the makeup is applied or face images before and after the makeup of a certain process is applied, within one face image. Accordingly, the effect of makeup in the makeup simulation can be easily recognized.

MODIFIED EXAMPLES

The present invention is not limited to the above-described embodiments. The embodiments may be modified as follows. In addition, the following modified examples may be combined.

Modified Example 1

In the above-described embodiments, the makeup simulation may be performed by using cosmetic products or makeup tools owned by the user. In this case, the storage unit 27 of the user terminal 20 stores information indicating the cosmetic products or makeup tools owned by the user in advance. Each screen displayed in the above-described simulation processing includes a call button. When the user presses the call button using the input unit 24, a list of cosmetic products or makeup tools owned by the user is generated based on the information stored in the storage unit 27. The output unit 204 displays the list of the cosmetic products or makeup tools on the display unit 25. The list of cosmetic products or makeup tools may be included in a part of the screen which is already displayed on the display unit 25, or may be displayed in a pop-up form on the screen.

If the list of cosmetic products or makeup tools is displayed, the user selects a desired cosmetic product or makeup tool from the list of cosmetic products or makeup tools using the input unit 24. The generating unit 202 generates a face image to which the makeup has been applied according to the selected cosmetic product or makeup tool. For example, the generating unit 202 applies a makeup color corresponding to the selected cosmetic product to a target portion of the face image.

According to this modified example, the user can perform the makeup simulation using the cosmetic products or makeup tools owned by the user. As a result, for example, the user can purchase a cosmetic product used for the makeup that matches the colors of cosmetic products owned by the user.

Further, the makeup color displayed on the display unit 25 may be different from the actual makeup color by the characteristics of the display unit 25. However, the user can recognize the difference between the actual makeup color and the makeup color displayed on the display unit 25, by simulating the makeup using the cosmetic products owned by the user. Furthermore, it is possible to estimate the actual makeup color from the makeup color displayed on the display unit 25, by considering this difference. As a result, even if the makeup color displayed on the display unit 25 when the makeup simulation is performed and the actually purchased makeup color are different, the user dissatisfaction caused by this difference can be reduced.

Modified Example 2

In the above-described embodiments, a background or light effect corresponding to a scene may be added to a combined image. The scene refers to a scene corresponding to time or place such as outdoors in the daytime, an office in the daytime, a restaurant in the night, and the like. In these scenes, conditions of light shining on the user, such as a light intensity, a light color, a light direction, a light source position, and the like are different. The light effect is an image imitating the light shining on the user in each scene.

Here, it is assumed that the user selects a scene of the restaurant in the night using the input unit 24. In this case, the combining unit 203 may add a typical image representing an interior of the restaurant in the night to, for example, a background of the combined image 551 shown in FIG. 13. Further, the combining unit 203 may add to the combined image 551 the light effect simulating lighting typically used at the restaurant in the night. In this case, a shadow may be added to the combined image 551 according to unevenness of the user's face. The unevenness of the user's face may be preset. As another example, a three-dimensional combined image may be generated, and the shadow may be added to this combined image. The three-dimensional combined image may be generated, for example, by capturing images of the user's head from all directions of 360 degrees by the image capturing unit 26.

In addition, a sound matching the scene selected by the user may be outputted. In this case, the user terminal 20 includes a speaker for outputting the sound. For example, as described above, when the scene of the restaurant in the night is selected, music with a calm atmosphere like that played at the restaurant in the night may be outputted.

Modified Example 3

In the above-described simulation processing, a face image after a certain time has elapsed since makeup is applied may be displayed. When the makeup is actually applied to a user's face, the makeup collapses as time passes. A state in which the makeup collapses includes, for example, a state in which a color of the makeup is removed, a state in which the color of the makeup is dull, a state in which a gloss is increased by perspiration and sebum, or a state in which the color of the makeup spreads in another area. In order to simulate the collapsed state, the generating unit 202 generates a face image after a predetermined time has elapsed since the makeup is applied. More specifically, the generating unit 202 changes the face image after the predetermined time has elapsed by changing the color of the makeup, a color of the face image or an area to which the makeup is applied, in the face image immediately after the makeup is applied.

For example, the face image after the predetermined time has elapsed may have a lower concentration or saturation of the makeup color than the face image immediately after the makeup is applied. Further, the face image after the predetermined time has elapsed may have a partially higher glossiness than the face image immediately after the makeup is applied. Furthermore, the face image after the predetermined time has elapsed may have a more enlarged area on which the makeup color is painted, compared with the face image immediately after the makeup is applied. In this case, the combining unit 203 may combine the left half of the face image immediately after the makeup is applied and the right half of the face image after the predetermined time has elapsed to generate a combined image.

As another example, the extent to which the makeup collapses may be different depending on the cosmetic product. In this case, a selection of a cosmetic product to be used for the makeup may be accepted, and an amount of change in the color or an amount of change in the area may be changed according to the selected cosmetic product. In this case, the combining unit 203 may generate the combined image by combining the left half of the face image after the predetermined time has elapsed since the makeup is applied by using a certain cosmetic product and the right half of the face image after the predetermined time has elapsed since the makeup is applied by using a different cosmetic product.

Modified Example 4

The method of generating a combined image is not limited to the method described in embodiments. For example, the upper half of a certain face image and the lower half of another face image may be combined. As another example, the half of a specific area in a certain face image and a part other than the half of a specific area in another face image may be combined. For example, the right half of a mouth area in a certain face image and the other areas of another face image, that is, the left half of the mouth area and the areas other than the mouth may be combined. In addition, parts of three or more face images may be combined.

Modified Example 5

In the above-described embodiments, after the combined image is generated, a ratio of the plurality of face images constituting the combined image may be changed. As shown in FIG. 13, a screen 255 includes a dividing line 554 indicating a boundary of the plurality of face images constituting the combined image. The user performs an operation of moving the dividing line 554 using the input unit 24. Here, it is assumed that the dividing line 554 on a combined image 551 has been moved. If the dividing line 554 is moved, the combining unit 203 re-combines two face images constituting the combined image 551 according to a ratio corresponding to a position of the dividing line 554 after the movement. As a result, for example, when the dividing line 554 on the combined image 551 is moved in a right direction toward the screen 255, a portion of the face image constituting the right half of the combined image 551 decreases, and a portion of the face image constituting the left half of the combined image 551 increases. On the contrary, when the dividing line 554 is moved to a left direction towards the screen 255, the portion of the face image constituting the left half of the combined image 551 decreases, and the portion of the face image constituting the right half of the combined image 551 increases.

Modified Example 6

In the above-described embodiments, parts of a plurality of face images are combined and displayed. However, these face images may be alternately displayed without being combined. As another example, in the combined image, the right half or the left half of the plurality of face images, to which the makeup up to a plurality of processes performed prior to a target process has been applied, may be displayed in order. For example, a face image constituting the right half of the combined image 551 shown in FIG. 13 is a face image after the makeup of the processes 1, 2-1, 2-2, 3, and 4 is applied. In this case, in the right half of the combined image 551, the right half of the plurality of face images to which the makeup up to the respective processes has been applied may be displayed in order. If a display time of each face image is shortened, a state in which the makeup of each process is sequentially applied to the right half of the user's face image is displayed like a moving image.

Modified Example 7

In the above-described embodiments, the purchase screen 256 may include product information of a makeup tool used in the makeup simulation. In this case, the server 10 stores product information of makeup tools which are registered in advance. The user terminal 20 transmits to the server 10 information indicating the makeup tool used in the makeup simulation. The server 10 determines a makeup tool corresponding to the makeup tool used in the makeup simulation based on the information indicating the makeup tool received from the user terminal 20, and transmits the product information of the makeup tool to the user terminal 20. At this time, the makeup tool determined by the server 10 may be the same as or similar to the makeup tool used in the makeup simulation, or may be a makeup tool having the same function.

Modified Example 8

The above-described makeup simulation processing may be performed by the user terminal 20 used by the user and a terminal different from the user terminal 20.

Figure 15:
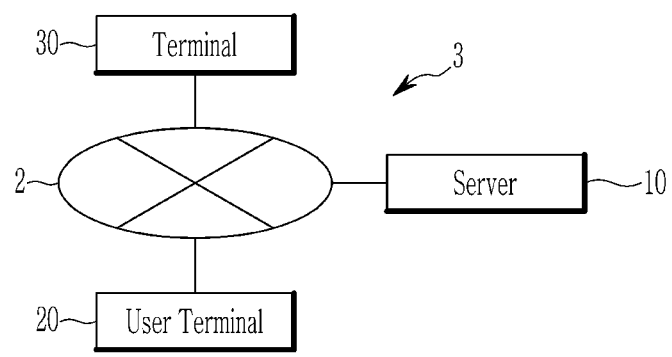
FIG. 15 is a diagram showing an example of a purchase support system 3 according to a modification.

FIG. 15 is a diagram showing an example of a purchase support system 3 (an example of an image processing system) according to a modified example. The purchase support system 3 includes a terminal 30 in addition to the server 10 and the user terminal 20 shown in FIG. 1. The user terminal 20 and the terminal 30 are connected via the network 2. Like the user terminal 20, the terminal 30 is a computer such as a tablet terminal, a portable terminal, a personal computer, or the like. The terminal 30 is used by, for example, a professional makeup artist.

In this case, the user terminal 20 transmits the user's face image captured by the image capturing unit 26 to the terminal 30. The terminal 30 applies makeup to the face image received from the user terminal 20 and generates a face image after the makeup is applied. In this case, the terminal 30 has a function of the generating unit 202 described above. Upon completing the makeup, the terminal 30 transmits the face image after the makeup is applied to the user terminal 20. The user terminal 20 combines a part of the face image before the makeup is applied and a part of the face image after the makeup is applied to generate a combined image, and outputs the combined image. The user can learn the makeup suitable for the user's face by viewing the combined image.

Modified Example 9

The steps of processing performed in the purchase support system 1 are not limited to examples described in the above-described embodiments. The steps of processing may be interchanged unless there is a contradiction. Further, the present invention may be provided as a method including steps of processing performed in the purchase support system 1 or the user terminal 20.

Modified Example 10

The present invention may be provided as a program executed in the user terminal 20. This program may be downloaded via the network 2 such as the Internet. In addition, the programs may be provided in a state recorded in a computer-readable recording medium such as a magnetic recording medium (a magnetic tape, a magnetic disk or the like), an optical recording medium (an optical disk or the like), or a magneto-optical recording medium.

What is claimed is:

1. An image processing apparatus comprising:
an acquiring unit that acquires a face image of a user;
a generating unit that performs makeup simulations including a plurality of processes using the acquired face image in accordance with an operation of the user, and generates a plurality of face images according to makeup simulations up to different processes included in the plurality of processes;
a combining unit that combines parts of two face images including the acquired face image and a face image according to a makeup simulation of the plurality of processes among the plurality of generated face images to generate a combined image;
an output unit that outputs the generated combined image and a list of the plurality of processes; and
a changing unit that, in accordance with an operation of selecting a process included in the plurality of processes from the outputted list, changes at least a part of one face image in the two face images included in the combined image to a part of a face image according to a makeup simulation up to the selected process among the plurality of generated face images.

2. The image processing apparatus according to claim 1, wherein the changing unit, in accordance with an operation of selecting a first process and a second process included in the plurality of processes from the outputted list, changes a part of one face image in the two face images included in the combined image to a part of a face image according to a makeup simulation up to the first process among the plurality of generated face images, and changes a part of the other face image in the two face images included in the combined image to a part of a face image according to a makeup simulation up to the second process among the plurality of generated face images.

3. The image processing apparatus according to claim 1, wherein when a color of makeup applied in a target process among the plurality of processes is changed, the generating unit generates reflects a change in the color of the makeup to the plurality of face images.

4. The image processing apparatus according to claim 1, wherein, when a target process is deleted from the plurality of processes, the generating unit deletes a color portion of makeup which is applied in the target process from the plurality of face images.

5. The image processing apparatus according to claim 1, wherein the plurality of processes, in a case where the makeup is applied to a plurality of areas included in the face image, are divided based on areas to which the makeup is applied, or in a case where a color of the makeup is overlappingly painted a plurality of times, are divided based on times the color of the makeup is painted.

6. The image processing apparatus according to claim 1, wherein the generating unit changes a density of a color of the makeup, an uniformity of the density, a range to which the makeup is applied, or a range to which a boundary portion of the color is blurred, by a makeup tool selected by the user.

7. The image processing apparatus according to claim 1, wherein the combining unit adds a background or light effect corresponding to a scene selected by the user to the combined image.

8. The image processing apparatus according to claim 1, wherein, when a ratio of the two face images constituting the combined image is changed, the combining unit combines parts of the two face images according to the changed ratio.

9. An image processing system comprising:
an acquiring unit that acquires a face image of a user;
a generating unit that performs makeup simulations including a plurality of processes using the acquired face image in accordance with an operation of the user, and generates a plurality of face images according to makeup simulations up to different processes included in the plurality of processes;
a combining unit that combines parts of two face images including the acquired face image and a face image according to a makeup simulation of the plurality of processes among the plurality of generated face images to generate a combined image;
an output unit that outputs the generated combined image and a list of the plurality of processes; and
a changing unit that, in accordance with an operation of selecting a process included in the plurality of processes from the outputted list, changes at least a part of one face image in the two face images included in the combined image to a part of a face image according to a makeup simulation up to the selected process among the plurality of generated face images.

10. A program stored on a non-transitory computer readable medium for causing a computer to execute:
  acquiring a face image of a user;
  performing makeup simulations including a plurality of processes using the acquired face image in accordance with an operation of the user, and generating a plurality of face images according to makeup simulations up to different processes included in the plurality of processes;
  combining parts of two face images including the acquired face image and a face image according to a makeup simulation of the plurality of processes among the plurality of generated face images to generate a combined image;
  outputting the generated combined image and a list of the plurality of processes; and
  in accordance with an operation of selecting a process included in the plurality of processes from the outputted list, changing, at least a part of one face image in the two face images included in the combined image to a part of a face image according to a makeup simulation up to the selected process among the plurality of generated face images.

* * * * *